(12) United States Patent
DeMaio

(10) Patent No.: US 12,330,255 B2
(45) Date of Patent: Jun. 17, 2025

(54) CLAMPING SYSTEM AND METHOD FOR USING SAME

(71) Applicant: Jeffrey A. DeMaio, Groton, CT (US)

(72) Inventor: Jeffrey A. DeMaio, Groton, CT (US)

(73) Assignee: SHELBY SUPPLY CO., Tolland, CT (US)

( * ) Notice: Subject to any disclaimer, the term of this patent is extended or adjusted under 35 U.S.C. 154(b) by 475 days.

(21) Appl. No.: 17/715,559

(22) Filed: Apr. 7, 2022

(65) Prior Publication Data

US 2023/0321775 A1    Oct. 12, 2023

(51) Int. Cl.
*B23Q 3/10*   (2006.01)
*B23Q 3/06*   (2006.01)

(52) U.S. Cl.
CPC ............ *B23Q 3/102* (2013.01); *B23Q 3/067* (2013.01)

(58) Field of Classification Search
CPC .......... B23Q 3/069; B23Q 3/02; B23Q 3/102; B23Q 3/106; B23Q 3/107; B25B 1/103; B25B 5/006; B25B 5/10; B25B 5/101; B25B 5/104–108; B25H 1/08; B25H 1/10
See application file for complete search history.

(56) References Cited

U.S. PATENT DOCUMENTS

| | | |
|---|---|---|
| 5,046,021 A | 9/1991 | Salvagnini |
| 5,190,273 A | 3/1993 | Salvagnini |
| 5,452,885 A * | 9/1995 | Beere ................. B25B 1/18 269/902 |
| 5,487,539 A | 1/1996 | Obrist |
| 5,788,225 A | 8/1998 | Iwata |
| 6,105,951 A | 8/2000 | Shibata |
| 2003/0193122 A1 * | 10/2003 | Nishimura ............. B25B 5/106 269/99 |

FOREIGN PATENT DOCUMENTS

| | | |
|---|---|---|
| CN | 102328215 A | 1/2012 |
| CN | 105436921 A | 3/2016 |
| CN | 107127607 A | 9/2017 |
| CN | 108127425 A | 6/2018 |
| CN | 211759926 U | 10/2020 |
| CN | 108972032 B | 7/2021 |
| CN | 215432579 U | 1/2022 |

* cited by examiner

*Primary Examiner* — Tyrone V Hall, Jr.
(74) *Attorney, Agent, or Firm* — Getz Balich LLC

(57) ABSTRACT

A clamp includes a base portion and a grip portion. The base portion has a base end. The base portion includes an outer cylindrical member disposed about a clamp center axis. The outer cylindrical member extends from the base end to an outer distal end. The outer distal end of the outer cylindrical member defines an annular first clamping surface disposed about the clamp center axis. The outer cylindrical member defines a base internal cavity extending from a base opening. The grip portion includes a cylindrical body and a grip member extending radially outward from the cylindrical body. The grip portion includes a second clamping surface. The cylindrical body is configured to be positioned within the base internal cavity of the base portion such that the second clamping surface of the grip portion radially overlaps the annular first clamping surface of the base portion.

7 Claims, 10 Drawing Sheets

CLAMPING SYSTEM AND METHOD FOR USING SAME

BACKGROUND

1. Technical Field

This disclosure relates generally to manufacturing systems and more particularly to clamping and clamp positioning systems and methods for manufacturing systems.

2. Background Information

Manufacturing systems, such as computer numerical coordinate (CNC) systems, may require the use of fixturing components such as clamps, vices, chucks, fasteners, etc. for securely holding workpieces. Fixturing components are increasingly used in automated manufacturing systems to hold larger and more frangible workpieces which must be precisely positioned, relative to the manufacturing system, without damaging or distorting said workpieces. Moreover, the precise positioning of fixturing components for use by manufacturing systems may contribute considerably to cycle times for processing, machining, manufacturing, etc. of workpieces into finished components. Accordingly, what is needed are improved fixturing systems and methods which address one or more of the above-noted concerns.

SUMMARY

It should be understood that any or all of the features or embodiments described herein can be used or combined in any combination with each and every other feature or embodiment described herein unless expressly noted otherwise.

According to an aspect of the present disclosure, a clamp includes a base portion and a grip portion. The base portion has a base end. The base portion includes an outer cylindrical member disposed about a clamp center axis. The outer cylindrical member extends from the base end to an outer distal end. The outer distal end of the outer cylindrical member defines an annular first clamping surface disposed about the clamp center axis. The outer cylindrical member defines a base internal cavity extending from a base opening. The base opening is located at the outer distal end of the outer cylindrical member. The grip portion includes a cylindrical body and a grip member extending radially outward from the cylindrical body with respect to the clamp center axis. The grip portion includes a second clamping surface. The cylindrical body is configured to be positioned within the base internal cavity of the base portion such that the second clamping surface of the grip portion radially overlaps the annular first clamping surface of the base portion.

In any of the aspects or embodiments described above and herein, the cylindrical body of the grip portion may extend from an inner end to an outer end opposite the inner end. The cylindrical body may define a body internal cavity extending from a body opening to the body internal cavity. The body opening may be located at the inner end of the cylindrical body.

In any of the aspects or embodiments described above and herein, the base portion may include an inner cylindrical member disposed about the clamp center axis and located within the outer cylindrical member. The cylindrical body of the grip portion may be configured to surround the inner cylindrical member with the cylindrical body positioned within the base internal cavity of the base portion.

In any of the aspects or embodiments described above and herein, the inner cylindrical member may define a threaded internal aperture disposed about the clamp center axis.

In any of the aspects or embodiments described above and herein, the inner cylindrical member may extend from the base end to an inner distal end and the inner distal end may be located axially inward of the outer distal end with respect to the clamp center axis to define an axial gap between the outer distal end and the inner distal end.

In any of the aspects or embodiments described above and herein, the cylindrical body may include a fastener aperture extending from the outer end to the body internal cavity. The fastener aperture may be disposed about the clamp center axis.

In any of the aspects or embodiments described above and herein, the base portion may include a fastening member extending radially outward from the outer cylindrical member. The fastening member may extend from the base end to a distal fastening end opposite the base end. The fastening member may include an elongated fastening aperture extending from the distal fastening end to the base end.

In any of the aspects or embodiments described above and herein, the grip portion may be configured to rotate about the clamp center axis with the cylindrical body positioned within the base internal cavity.

In any of the aspects or embodiments described above and herein, the grip member of the grip portion may include a dowel defining at least a portion of the second clamping surface.

According to another aspect of the present disclosure, a clamping system includes a clamp locator. The clamp locator includes a fixed portion disposed about a locator center axis. The clamp locator further includes a translating portion mounted to the fixed portion. The translating portion is configured to translate relative to the fixed portion along the locator center axis between a raised position and a lowered position. The clamp locator further includes a locating portion mounted to a distal end of the translating portion with respect to the fixed portion. The locating portion includes a cylindrical body disposed about the locator center axis. The cylindrical body has a first diameter.

In any of the aspects or embodiments described above and herein, the clamp locator may further include a biasing member connected to the fixed portion and the translating portion. The biasing member may be configured to bias the translating portion in the raised position.

In any of the aspects or embodiments described above and herein, the clamping system may further include a clamp including a base portion having a base end. The base portion may include an outer cylindrical member disposed about a clamp center axis. The outer cylindrical member may extend from the base end to an outer distal end. The outer distal end of the outer cylindrical member may define an annular first clamping surface disposed about the clamp center axis. The outer cylindrical member may define a base internal cavity extending from a base opening. The base opening may be located at the distal end of the outer cylindrical member. The base opening may have a second diameter which is substantially equal to or greater than the first diameter and the cylindrical body of the locating portion of the clamp locator may be configured to be selectively positioned within the base opening.

In any of the aspects or embodiments described above and herein, the base portion may be configured to be rotatable about the clamp center axis with the cylindrical body of the locating portion of the clamp locator positioned within the base opening.

In any of the aspects or embodiments described above and herein, the clamping system may further include a computer numerical control (CNC) system. The CNC system may include a platform and a spindle configured for movement along one or more of an X-axis, a Y-axis, or a Z-axis relative to the platform. The fixed portion of the clamp locator may be configured to be mounted to the spindle.

In any of the aspects or embodiments described above and herein, the CNC system may further include a controller and the controller may be configured to effect positioning of the clamp locator at a predetermined clamp position relative to the platform.

According to another aspect of the present disclosure, a method for operating a clamping system includes mounting a clamp locator to a spindle of a computer numerical control (CNC) system, positioning the clamp locator, with the CNC system, at a predetermined clamp position relative to a platform of the CNC system, positioning a base portion of a clamp on the platform by engaging the base portion with the clamp locator mounted to the spindle, and fixing the base portion of the clamp to the platform.

In any of the aspects or embodiments described above and herein, the step of fixing the base portion of the clamp to the platform may include rotating the base portion about the clamp locator, while the clamp locator is engaged with the base portion, to align a first fastener aperture of the base portion with a second fastener aperture of the platform.

In any of the aspects or embodiments described above and herein, the method may further include installing a grip portion into the base portion subsequent to fixing the base portion of the clamp to the platform.

In any of the aspects or embodiments described above and herein, the method may further include positioning a workpiece on the base portion so that the workpiece is retained between the grip portion and the base portion.

In any of the aspects or embodiments described above and herein, the step of positioning the spindle at a predetermined clamp position may include positioning the clamp locator, with the spindle, at a predetermined first height from the platform which is greater than a second height of the base portion.

The present disclosure, and all its aspects, embodiments and advantages associated therewith will become more readily apparent in view of the detailed description provided below, including the accompanying drawings.

DETAILED DESCRIPTION

The present disclosure is directed to clamps and clamping systems and methods which include such clamps. As will be clear from the description below, the clamps of the present disclosure can be used for a wide variety of machining and manufacturing operations. Embodiments of the present disclosure clamps and clamping systems provide particular utility because they can be configured for use with many existing types of manufacturing systems including, but not limited to, computer numerical control (CNC) manufacturing systems. As will be described herein, the present disclosure clamps and clamping systems and methods provide advantages not available with commercial clamping and fixturing equipment presently available to the public.

To facilitate the description herein, embodiments of the present disclosure clamping system 20 will be described as they may be used with an exemplary CNC system. A CNC system provides automated control of one or more machining tools based on coded programming instructions executed by a controller. The CNC system may, therefore, be used to machine, drill, additively manufacture, process, or otherwise manufacture a piece of material (e.g., workpiece) including, but not limited to, metals, plastics, woods, ceramics, composites, etc. To be clear, this CNC system 1000 configuration is exemplary, and the present disclosure clamping system 20 is not limited to use with the above-described CNC system 1000. Moreover, the present disclosure clamping system 20 is not limited to automated manufacturing systems and may also be beneficial for manufacturing systems in which manual manufacturing steps are performed.

Figure 1:
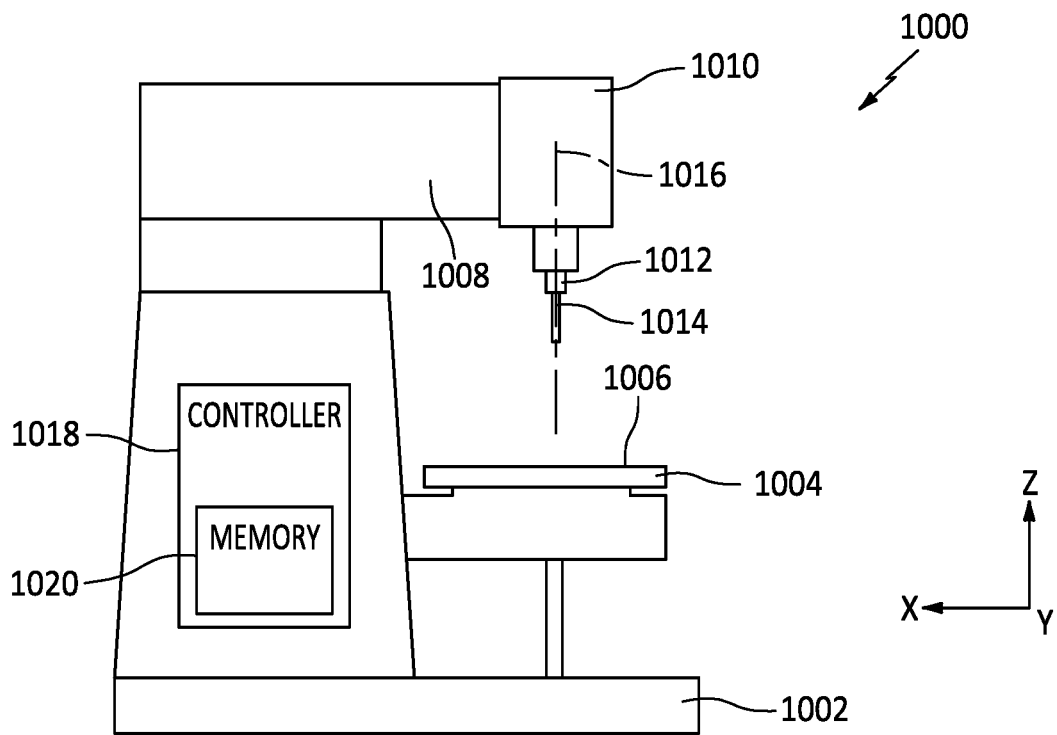
FIG. 1 illustrates a schematic view of a computer numerical control (CNC) system, in accordance with one or more embodiments of the present disclosure.

FIG. 1 illustrates an example of such a CNC system 1000. The CNC system 1000 includes a base 1002. The CNC system 1000 further includes a platform 1004 upon which a workpiece (not shown) may be positioned and/or secured for a manufacturing operation. The platform 1004 may be supported by the base 1002. The platform 1004 includes a platform surface 1006. The platform surface 1006 may be substantially planar and may be described as extending along an X-Y plane, as shown in FIG. 1. However, the present disclosure is not limited to any particular shape and/or orientation of the platform 1004 or the platform surface 1006, which shapes and/or orientations may be selected as necessary to accommodate a particular workpiece configuration. In some embodiments, the CNC system 1000 may be configured to move the platform 1004 relative to the base 1002. For example, the CNC system 1000 may be configured to move the platform 1004 along one or more of the X-axis, the Y-axis, or the Z-axis.

The CNC system 1000 includes an arm 1008 and a head 1010 mounted to and supported by the arm 1008. The CNC system 1000 includes at least one spindle 1012 mounted to the head 1010. The spindle 1012 is configured to selectively retain a machine tool 1014 for use in a manufacturing operation for a workpiece. The spindle 1012 extends along a spindle axis 1016. In some embodiments, the head 1010 may be configured to rotate the spindle 1012 about the spindle axis 1016 to effect rotation of the machine tool 1014. The arm 1008 and the head 1010 may be configured to move the spindle 1012 so as to accurately position the machine tool 1014 retained by the spindle 1012 relative to a workpiece supported by the platform 1004. The arm 1008 and the head 1010 may be configured to translate and/or rotate about one or more axes including, but not limited to, the X-axis, the Y-axis, and the Z-axis.

The CNC system 1000 may further include a controller 1018. The controller 1018 may include any type of computing device, computational circuit, or any type of process or processing circuit capable of executing a series of instructions that are stored in memory 1020 of the controller 1018. The controller 1018 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 1020 may represent one or more algorithms for controlling the aspects of the CNC system 1000, and the stored instructions are not limited to any particular form (e.g., program files, system data, buffers, drivers, utilities, system programs, etc.) provided they can be executed by the controller 1018. The instructions stored in memory 1020 may be in the form of G-code, M-code, or another suitable programming language which can be executed by the controller 1018. The instructions stored in memory 1020 may be generated by computer-aided design (CAD) or computer-aided manufacturing (CAM) software, whereby the physical dimensions of a particular workpiece may be translated into instructions for execution by the CNC system 1000. The memory 1020 may be a non-transitory computer readable storage medium configured to store instructions that when executed by one or more processors, cause the one or more processors to perform or cause the performance of certain functions. The memory 1020 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 1018 may be achieved via the use of hardware, software, firmware, or any combination thereof. The controller 1018 may also include input (e.g., a keyboard, a touch screen, etc.) and output devices (a monitor, sensor readouts, data ports, etc.) that enable the operator to input instructions, receive data, etc.

Figure 2:
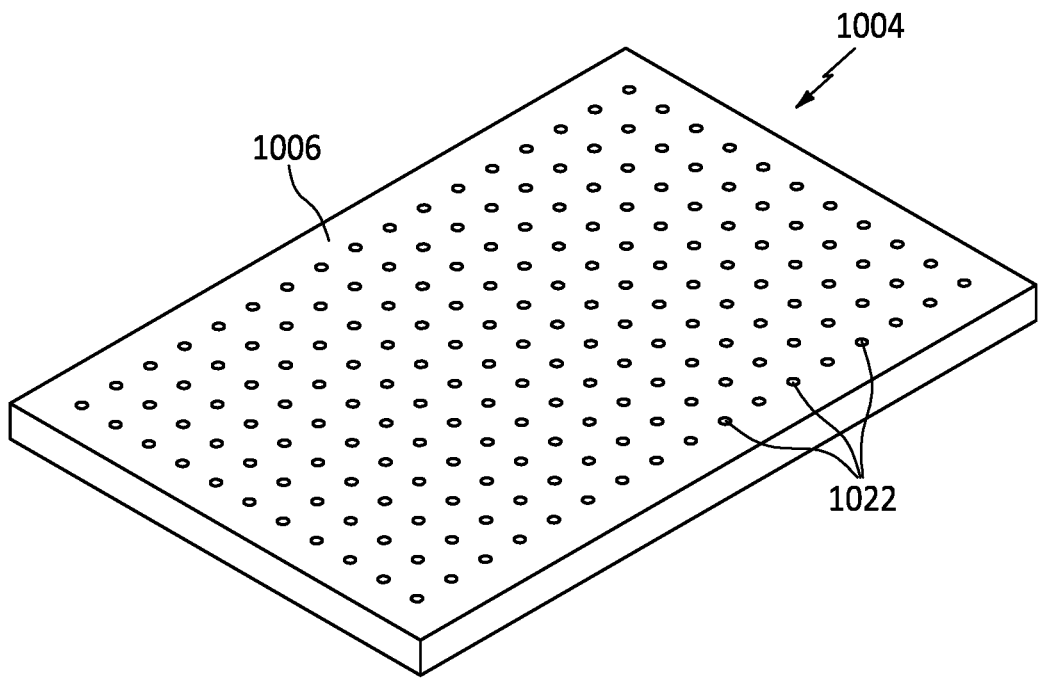
FIG. 2 illustrates perspective view of a platform for the CNC system of FIG. 1, in accordance with one or more embodiments of the present disclosure.

FIG. 2 illustrates a perspective view of an exemplary platform 1004 for the CNC system 1000. The platform 1004 of FIG. 2 includes a plurality of apertures 1022 formed through the platform surface 1006 of the platform 1004. As will be discussed in further detail, the apertures 1022 may be used to position and/or secure one or more fixturing components to the platform 1004. In some embodiments, the apertures 1022 may be threaded apertures, T-slots, or the like configured to securely mate with a counterpart fixturing component or fastener. The apertures 1022 of the FIG. 2 platform 1004 have a grid configuration in which the apertures 1022 are arranged in a series of substantially parallel columns and rows. However, the present disclosure is not limited to any particular arrangement of the apertures 1022 on the platform 1004.

Figure 3:
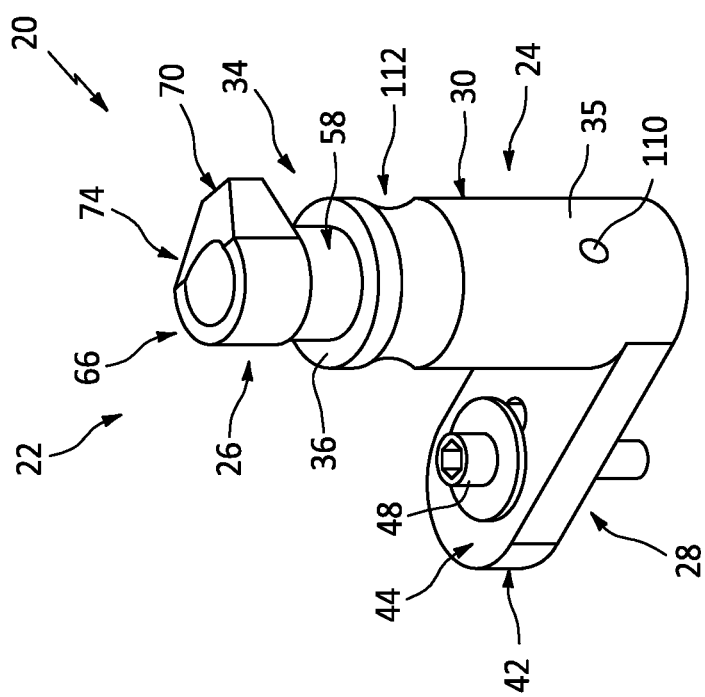
FIG. 3 illustrates a perspective view of a clamp for a clamping system, in accordance with one or more embodiments of the present disclosure.
Figure 4:
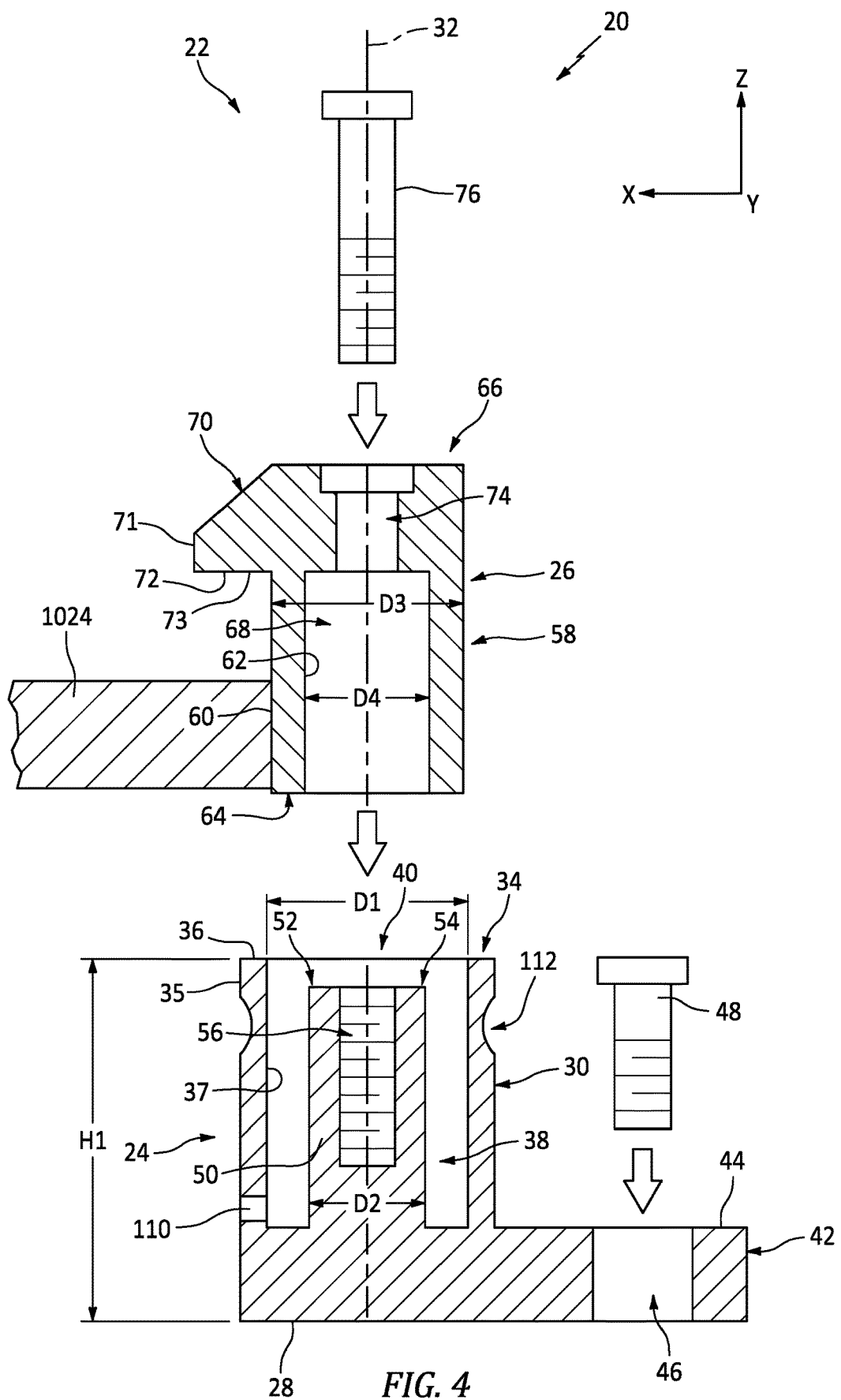
FIG. 4 illustrates a side sectional view of the clamp of FIG. 3, in accordance with one or more embodiments of the present disclosure.
Figure 7:
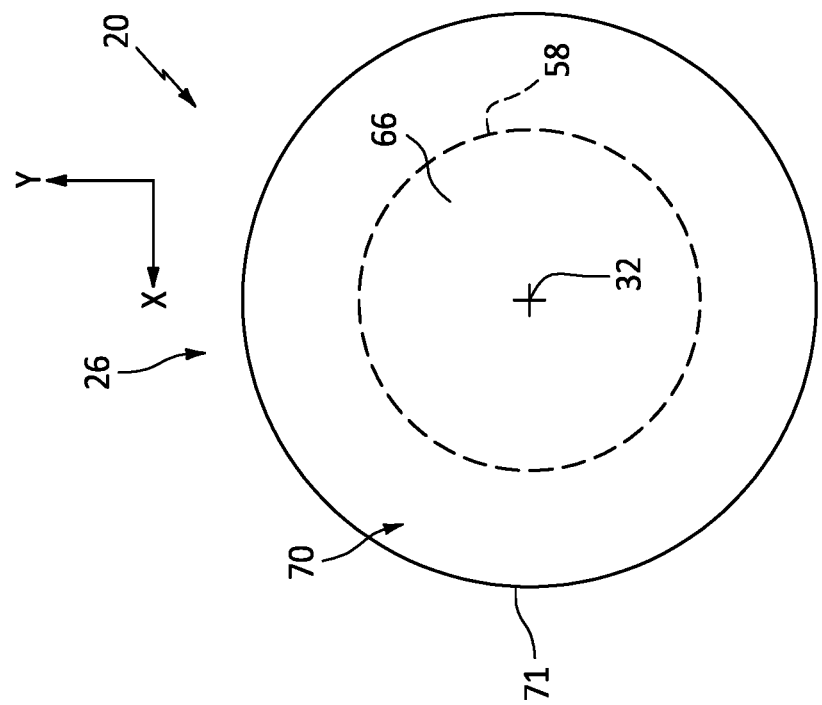
FIG. 7 illustrates a top view of a grip portion of a clamp, in accordance with one or more embodiments of the present disclosure.
Figure 6:
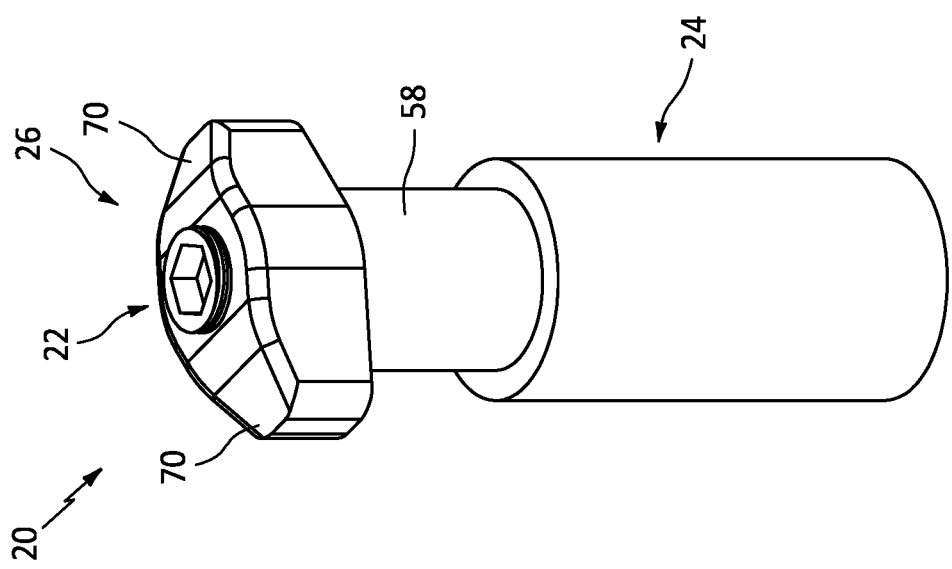
FIG. 6 illustrates a perspective view of a grip portion of a clamp, in accordance with one or more embodiments of the present disclosure.

Referring to FIGS. 3-7, the present disclosure clamping system 20 may include at least one clamp 22. The clamp 22 includes a base portion 24 and a grip portion 26. The base portion 24 includes a base end 28 configured to be positioned in contact with a support surface such as the platform surface 1006 of the platform 1004 (see FIGS. 1 and 2). The base portion 24 includes an outer cylindrical member 30. The outer cylindrical member 30 is disposed about a clamp center axis 32 of the clamp 22. The clamp center axis 32 may extend substantially orthogonal to the base end 28 of the base portion 24. The outer cylindrical member 30 extends from the base end 28 to an outer distal end 34 of the outer cylindrical member 30. The outer cylindrical member 30 includes an outer diameter surface 35 and an inner diameter surface 37 opposite the outer diameter surface 35. In some embodiments, the outer cylindrical member 30 may include a circumferential groove 112 formed in the outer diameter surface 35 to facilitate handling of the base portion 24 by a user. The outer distal end 34 of the outer cylindrical member 30 defines an annular first clamping surface 36 disposed about the clamp center axis 32. The annular first clamping surface 36 may extend between the outer diameter surface 35 and the inner diameter surface 37. The annular first clamping surface 36 may be a substantially planar surface which may be described as residing in an X-Y plane, as illustrated in FIG. 4. For example, the annular first clamping surface 36 may be substantially parallel to the base end 28 of the base portion 24. The outer cylindrical member 30 has a height H1 extending from the base end 28 to the outer distal end 34 (e.g., the annular first clamping surface 36). The outer cylindrical member 30 defines an internal cavity 38 of the base portion 24 located within the outer cylindrical member 30 and disposed about the clamp center axis 32. The internal cavity 38 extends from an opening 40 located at the outer distal end 34 of the base portion 24 toward the base end 28 of the base portion 24. The opening 40 has an opening diameter D1 defined by the outer cylindrical member 30.

The base portion 24 includes a fastening member 42. The fastening member 42 extends radially outward from the outer cylindrical member 30 with respect to the clamp center axis 32. The fastening member 42 extends from the base end 28 of the base portion 24 to a distal end 44 opposite the base end 28. The fastening member 42 includes a fastener aperture 46 extending from the base end 28 to the distal end 44. In some embodiments, the fastener aperture 46 may be elongated (e.g., a stadium shape, an oval shape, etc.), for example, in a radial direction with respect to the clamp center axis 32. As will be discussed in further detail, the fastener aperture 46 is configured to receive a fastener 48 for fixedly securing the base portion 24 to a support surface such as the platform surface 1006 of the platform 1004 (see FIGS. 1 and 2).

In some embodiments, the base portion 24 may include an inner cylindrical member 50. The inner cylindrical member 50 may be disposed about the clamp center axis 32. The inner cylindrical member 50 may be disposed within the outer cylindrical member 30 as shown in FIG. 3. For example, the inner cylindrical member 50 may be radially spaced from the outer cylindrical member 30 to further define the internal cavity 38 between the inner cylindrical member 50 and the outer cylindrical member 30. The inner cylindrical member 50 may, therefore, have an outer diameter D2 which is less than the opening diameter D1 of the opening 40. The inner cylindrical member 50 may extend from the base end 28 to an inner distal end 52 of the inner cylindrical member 50. The inner distal end 52 of the inner cylindrical member 50 may be located axially inward of the outer distal end 34 of the outer cylindrical member 30, with respect to the clamp center axis 32, to define an axial gap 54 at the opening 40 of the internal cavity 38. The axial gap 54 may, therefore, have a same diameter as the opening diameter D1 of the opening 40. The inner cylindrical member 50 may include a fastener aperture 56 extending from the inner distal end 52 toward the base end 28 about the clamp center axis 32. The fastener aperture 56 may be configured to receive a fastener, as will be discussed in further detail. The fastener aperture 56 may be a threaded aperture configured to securely retain a counterpart threaded fastener.

The grip portion 26 of the clamp 22 is separable from the base portion 24 as shown, for example, in FIG. 4. The grip portion 26 includes a cylindrical body 58 having an outer diameter surface 60 and an inner diameter surface 62 opposite the outer diameter surface 60. The cylindrical body 58 extends from an inner end 64 of the grip portion 26 to an outer end 66 of the grip portion 26 opposite the inner end 64. The cylindrical body 58 defines an internal cavity 68 located within the cylindrical body 58 and disposed about the clamp center axis 32. The internal cavity 68 extends from the inner end 64 of the grip portion 26 toward the outer end 66 of the grip portion 26. The cylindrical body 58 has an outer diameter D3 defined with respect to the outer diameter surface 60 of the cylindrical body 58. Similarly, the cylindrical body 58 has an inner diameter D4 defined with respect to the inner diameter surface 62. The outer diameter D3 of the cylindrical body 58 is less than the opening diameter D1 of the base portion 24, such that the cylindrical body 58 of the grip portion 26 can be inserted into the internal cavity 38 of the base portion 24 via the opening 40. The inner diameter D4 of the cylindrical body 58 may be greater than the outer diameter D2 of the inner cylindrical member 50 of the base portion 24 such that the cylindrical body 58 may surround the inner cylindrical member 50 with the grip portion 26 installed in the base portion 24.

The grip portion 26 further includes at least one grip member 70 which extends radially outward from the cylindrical body 58, with respect to the clamp center axis 32, to a distal end 71. The grip member 70 may be located at or proximate the outer end 66 of the grip portion 26. The grip member 70 defines a second clamping surface 72. The grip member 70 includes an inner surface 73 extending outward from the outer diameter surface 60. As shown in FIG. 4, for example, the inner surface 73 may extend outward from the outer diameter surface 60 of the cylindrical body 58 in a substantially radial direction, with respect to the clamp center axis 32. The second clamping surface 72 may extend between the outer diameter surface 60 and the distal end 71. In some embodiments, the inner surface 73 may define all or a portion of the second clamping surface 72. The second clamping surface 72, however, is not limited to the particular orientation or configuration illustrated in FIG. 4.

The second clamping surface 72 of the grip portion 26 is configured to be radially aligned with the annular first clamping surface 36 of the base portion 24, with respect to the clamp center axis 32. In other words, with the cylindrical body 58 of the grip portion 26 positioned within the internal cavity 38 of the base portion 24, the second clamping surface 72 of the grip portion 26 radially overlaps the annular first clamping surface 36 of the base portion 24. Accordingly, the annular first clamping surface 36 and the second clamping surface 72 may securely retain (e.g., clamp) a workpiece 1024 therebetween with the grip portion 26 installed in the base portion 24.

In some embodiments, the grip member 70 may extend about a portion of an outer diameter circumference of the cylindrical body 58 of the grip portion 26. In some embodiments, the grip portion 26 may include a single grip member 70 extending outward from the cylindrical body 58 as shown, for example, in FIGS. 3 and 4. In some embodiments, the grip portion 26 may include multiple grip members 70 extending outward from the cylindrical body 58 as shown, for example, in FIG. 6. The grip portion 26 of FIG. 6 includes opposing grip members 70 extending outward from opposing circumferential portions of the cylindrical body 58. In some embodiments, the grip member 70 may be formed around the entire outer diameter circumference of the cylindrical body 58 as shown, for example, in FIG. 7. Accordingly, the second clamping surface 72 defined by the grip member 70 may be an annular clamping surface disposed about the clamp center axis 32 and similar to the annular first clamping surface 36 defined by the outer cylindrical member 30 of the base portion 24.

In some embodiments, the grip portion 26 includes a fastener aperture 74 disposed about the clamp center axis 32. The fastener aperture 74 extends from the outer end 66 of the grip portion 26 to the internal cavity 68 defined within the cylindrical body 58 of the grip portion 26. As will be discussed in further detail, the fastener aperture 74 may be configured to receive a fastener 76 for fixedly securing the grip portion 26 to the base portion 24. For example, with the grip portion 26 installed in the base portion 24, the fastener 76 may pass through the fastener aperture 74 to threadedly engage the fastener aperture 56 of the inner cylindrical member 50 of the base portion 24.

Figure 5:
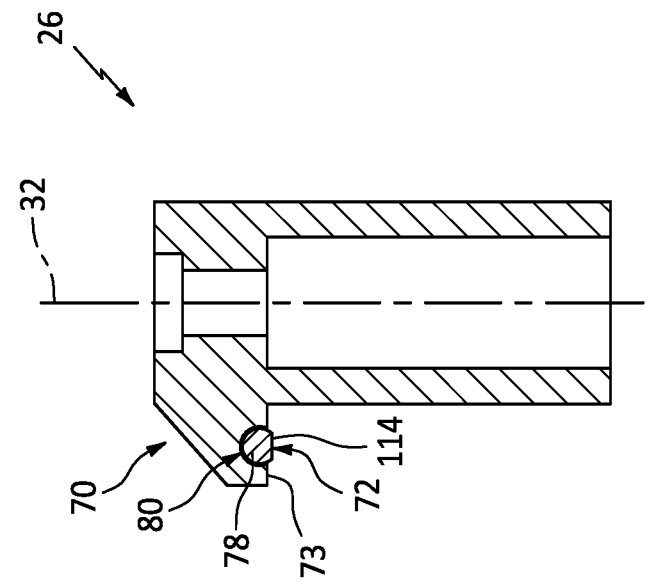
FIG. 5 illustrates a side sectional view of a portion of a clamp, in accordance with one or more embodiments of the present disclosure.

In some embodiments, the base portion 24 of the clamp 22 may include a vent aperture 110, as shown in FIGS. 3 and 4. The vent aperture 110 may extend through the outer cylindrical member 30 from the outer diameter surface 35 to the inner diameter surface 37. The vent aperture 110 may be formed through the cylindrical member 30 proximate a bottom of the internal cavity 38 (e.g., proximate the base end 28 of the base portion 24). The vent aperture 110 may allow air pressure within the internal cavity 38 to be equalized with air pressure outside the base portion 24 during insertion and removal of the grip portion 26 from the base portion 24, thereby As shown in FIG. 5, in some embodiments, the grip member 70 of the grip portion 26 may include a dowel 78 defining at least a portion of the second clamping surface 72. The dowel 78 may be partially retained within a dowel aperture 80 formed through the grip member 70. The dowel aperture 80 may extend through the grip member 70 in a direction which is substantially tangential to the clamp center axis 32 (e.g., a direction which is tangential with respect to an imaginary circle centered about the clamp center axis 32). The dowel 78 may include a flat portion 114 positioned outside of the dowel aperture 80. For example, the flat portion 114 of the dowel 78 may be axially spaced from the inner surface 73 of the grip member 70. The flat portion 114 may define all or a portion of the second clamping surface 72. In some embodiments, the dowel 78 may be made from a material which is different than a material of the grip portion 26. For example, the dowel 78 may be made from a material which is harder than a material of the grip portion 26, to allow the dowel 78 to securely retain the workpiece 1024 without deformation of the dowel 78. In the event that the dowel 78 is deformed or otherwise damaged, the dowel 78 may simply be replaced from the grip member 70. The dowel 78 may also be swapped for different machining applications (e.g., where a different dowel 78 material may be desired). In some embodiments, minor differences between the outer diameter D3 of the cylindrical body 58 of the grip portion 26 and the opening diameter D1 of the base portion 24 may allow some relative rotational movement (e.g., rocking which is transverse to the clamp center axis 32) between the grip portion 26 and the base portion 24. The dowel 78 may accommodate the relative rotational movement between the grip portion 26 and the base portion 24 such that the clamp 22 maintains a secure grip on the workpiece 1024 despite the relative rotational movement.

The base portion 24 and the grip portion 26 are not limited to any particular material or combination of materials, but a material that can securely hold and retain a workpiece for a selected manufacturing process (e.g., without significant movement or deflection of the workpiece), is preferred. Non-limiting examples of materials for the base portion 24 and/or the grip portion 26 include metals and metal alloys including steel and aluminum, composite materials, plastics, wood, and the like.

Figure 8:
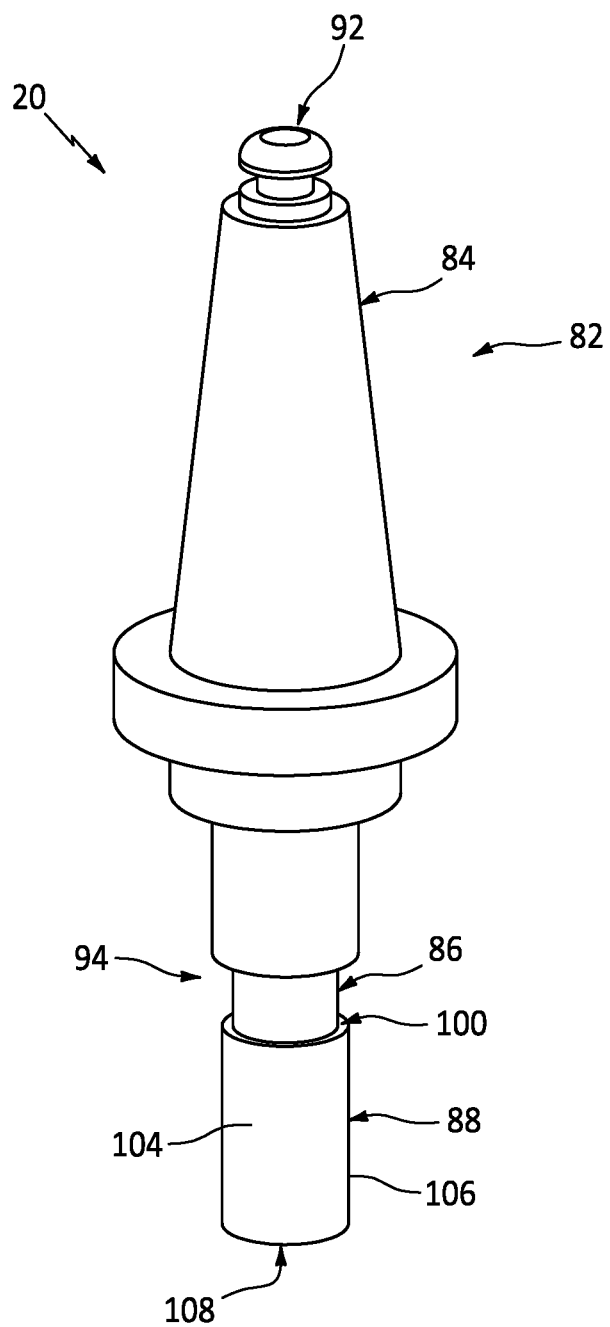
FIG. 8 illustrates a perspective view of a clamp locator for a clamping system, in accordance with one or more embodiments of the present disclosure.
Figure 9:
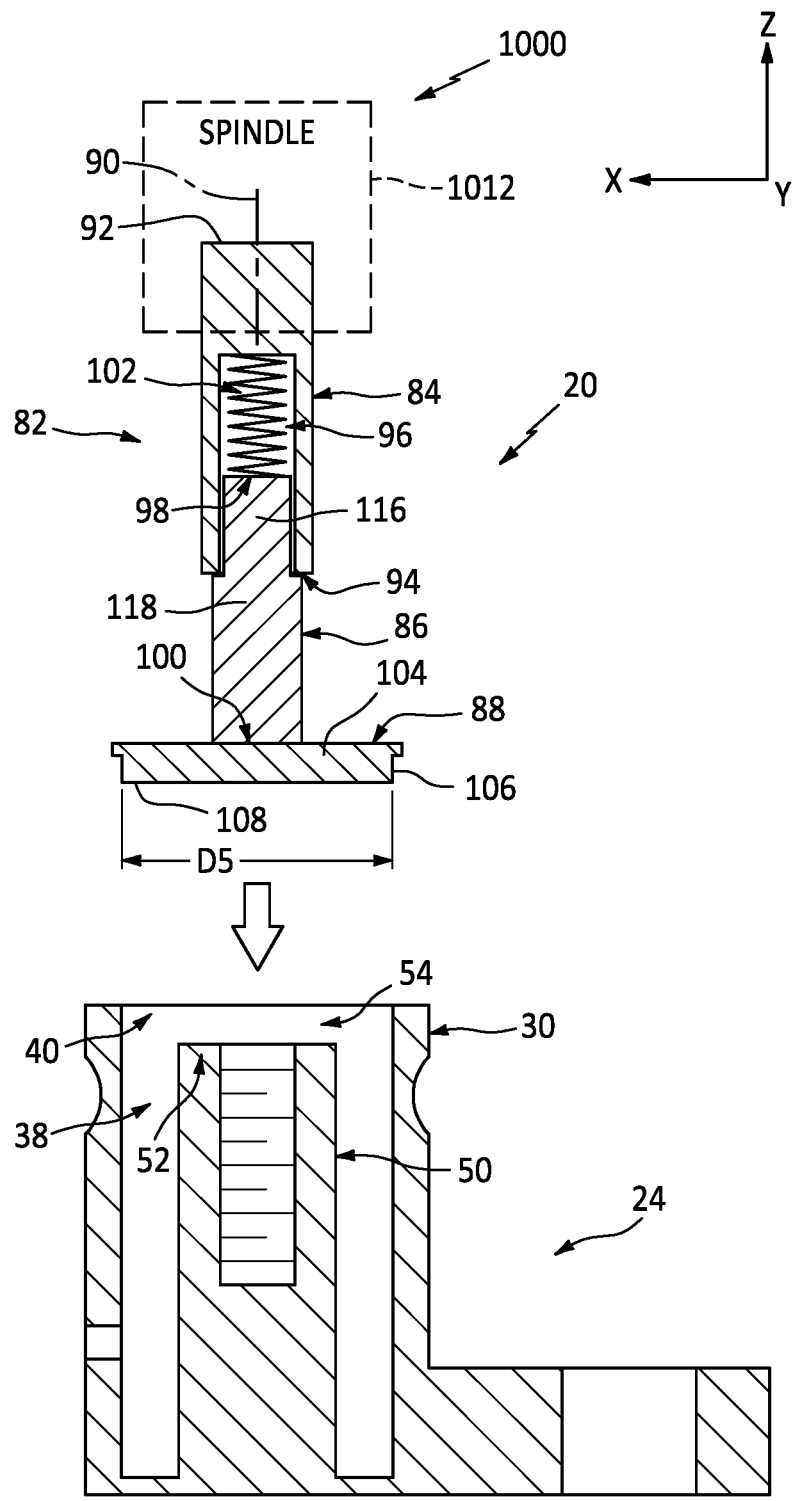
FIG. 9 illustrates a side sectional view of a clamp locator, in accordance with one or more embodiments of the present disclosure.

Referring to FIGS. 8 and 9, the present disclosure clamping system 20 may include a clamp locator 82. The clamp locator 82 includes a fixed portion 84, a translating portion 86, and a locating portion 88 disposed about a locator center axis 90. The fixed portion 84 extends along the locator center axis 90 from an upper end 92 to a lower end 94 opposite the upper end 92. The fixed portion 84 is configured to be securely retained by a manufacturing system at or proximate the upper end 92. For example, the fixed portion 84 may be installed on and securely retained by the spindle 1012 of the CNC system 1000 discussed above with respect to FIG. 1. Accordingly, in some embodiments, the CNC system 1000 may be understood to be part of the clamping system 20. In some embodiments, the fixed portion 84 may include an internal cavity 96 defined within the fixed portion 84 and disposed about the locator center axis 90. The internal cavity 96 may extend from the lower end 94 of the fixed portion 84 toward the upper end 92 of the fixed portion 84.

The translating portion 86 of the clamp locator 82 is mounted to the fixed portion 84. The translating portion extends along the locator center axis 90 from a proximate end 98 and a distal end 100 opposite the proximate end 98. The translating portion 86 is configured to translate relative to the fixed portion 84 along the locator center axis 90 between a raised position and a lowered position. The translating portion 86 of FIGS. 8 and 9 is mounted to the fixed portion 84 within the internal cavity 96. For example, the proximate end 98 of the translating portion 86 may be located within the internal cavity 96 while the distal end 100 of the translating portion 86 may be located outside of the internal cavity 96. In some embodiments, the translating portion 86 may include a first diameter sub-portion 116 and a second diameter sub-portion 118. The first diameter sub-portion 116 may be configured to translate within the fixed portion 84. The second diameter sub-portion 118 may have a diameter which is larger than a diameter of the first diameter sub-portion 116. The second diameter sub-portion 118 may be configured to abut the lower end 94 of the fixed portion 84 with the translating portion 86 in the raised position. The present disclosure is not limited to this particular mounting configuration of the translating portion 86 to the fixed portion 84 provided the translating portion 86 can translate relative to the fixed portion 84.

As shown in FIG. 9, the translating portion 86 may be connected to the fixed portion 84 by a biasing member 102. For example, the biasing member 102 may be connected to the proximate end 98 of the translating portion 86 and may further be connected to the fixed portion 84 within the internal cavity 96. The biasing member 102 may be configured to bias the translating portion 86 in the raised position relative to the fixed portion 86. In other words, the raised position may be a default position of the translating portion 86 relative to the fixed portion 84. The biasing force provided by the biasing member 102 may be overcome to translate the translating portion 86 from the raised position to the lowered position relative to the fixed portion 84. Examples of suitable biasing members 102 may include, but are not limited to, a spring as shown in FIG. 9, an elastomeric material, a bellows, and the like, and the present disclosure is not limited to any particular configuration of the biasing member 102.

The locating portion 88 of the clamp locator 82 is mounted to the distal end 100 of the translating portion 86. The locating portion 88 includes a cylindrical body 104 which, in some embodiments, may be radially enlarged relative to the translating portion 86. The cylindrical body 104 may include an outer diameter surface 106 disposed about the locator center axis 90. The cylindrical body 104 may further include a lower surface 108 which intersects the outer diameter surface 106. The lower surface 108 may be oriented so as to face away from the translating portion 86. The cylindrical body 104 has an outer diameter D5 defined with respect to the outer diameter surface 106 of the cylindrical body 104. The outer diameter D5 of the cylindrical body 104 may be less than or substantially equal to the opening diameter D1 defined by the outer cylindrical member 30 of the base portion 24, such that the cylindrical body 104 of the locating portion 86 can fit snugly within the opening 40 of the outer cylindrical member 30 while still allowing the base portion 24 to freely rotate about the cylindrical body 104 (e.g., about the clamp center axis 32).

Figure 10:
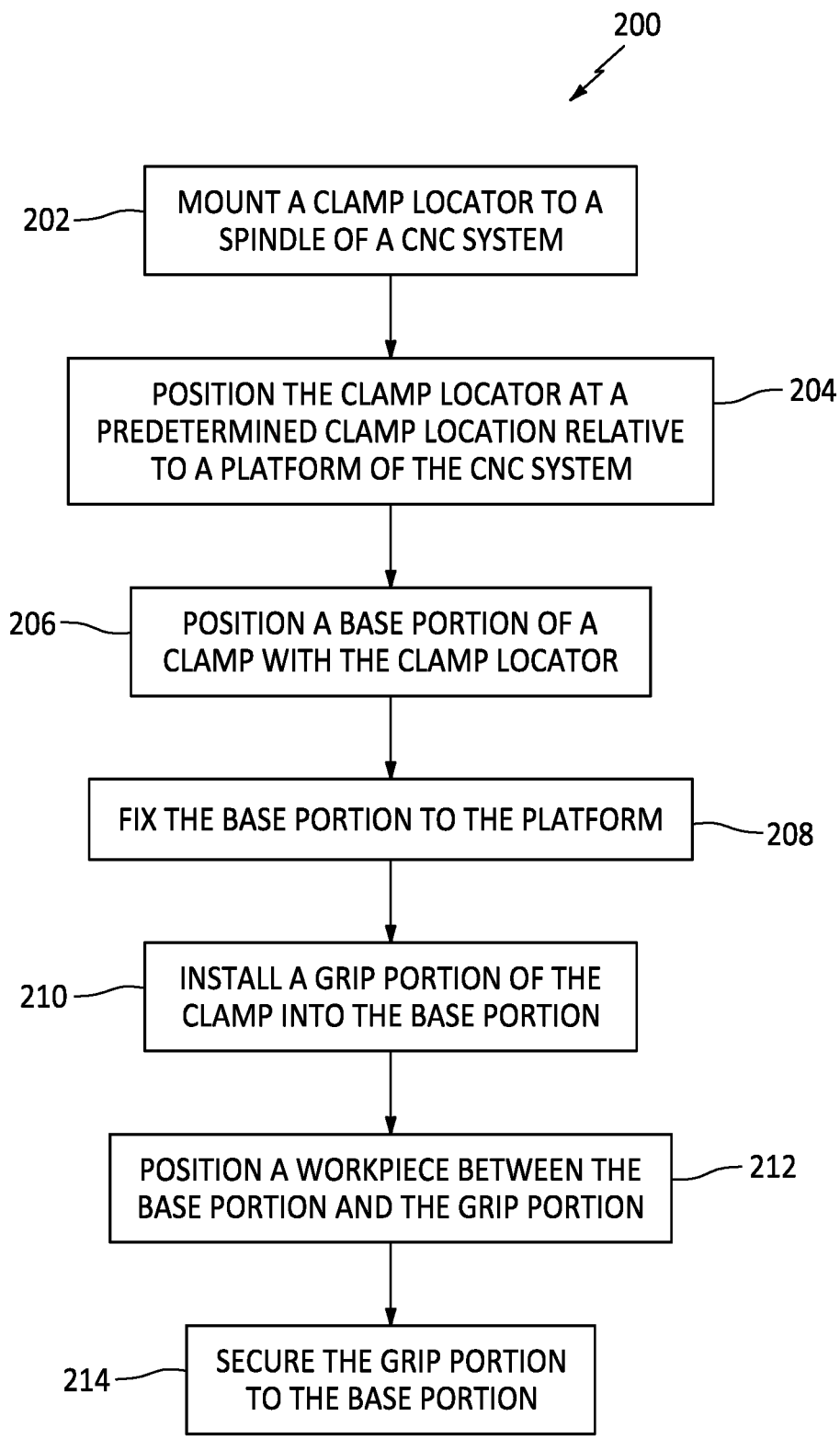
FIG. 10 illustrates a flow chart of a method for operating a clamping system, in accordance with one or more embodiments of the present disclosure.

Referring to FIGS. 1-4 and 8-16, the present disclosure includes a method 200 for operating a clamping system. FIG. 10 illustrates a flowchart of the method 200. For ease of description, the method 200 is described below with reference to the clamping system 20 and the CNC system 1000. The method 200, however, may alternatively be performed with other fixturing and manufacturing systems. Unless otherwise noted herein, it should be understood that the steps of method 200 are not required to be performed in the specific sequence in which they are discussed below and, in various embodiments, the steps of method 200 may be performed separately or simultaneously.

In Step 202, the clamp locator 82 is mounted to the spindle 1012 of the CNC system 1000 (see FIGS. 1 and 9). The fixed portion 84 of the clamp locator 82, proximate the upper end 92 of the fixed portion 84, may be inserted into, mounted on, or otherwise attached to the spindle 1012. For example, the clamp locator 82 may be retained by the spindle 1012 in a fashion which is similar to the machine tool 1014 discussed above, with regard to FIG. 1.

Figure 11:
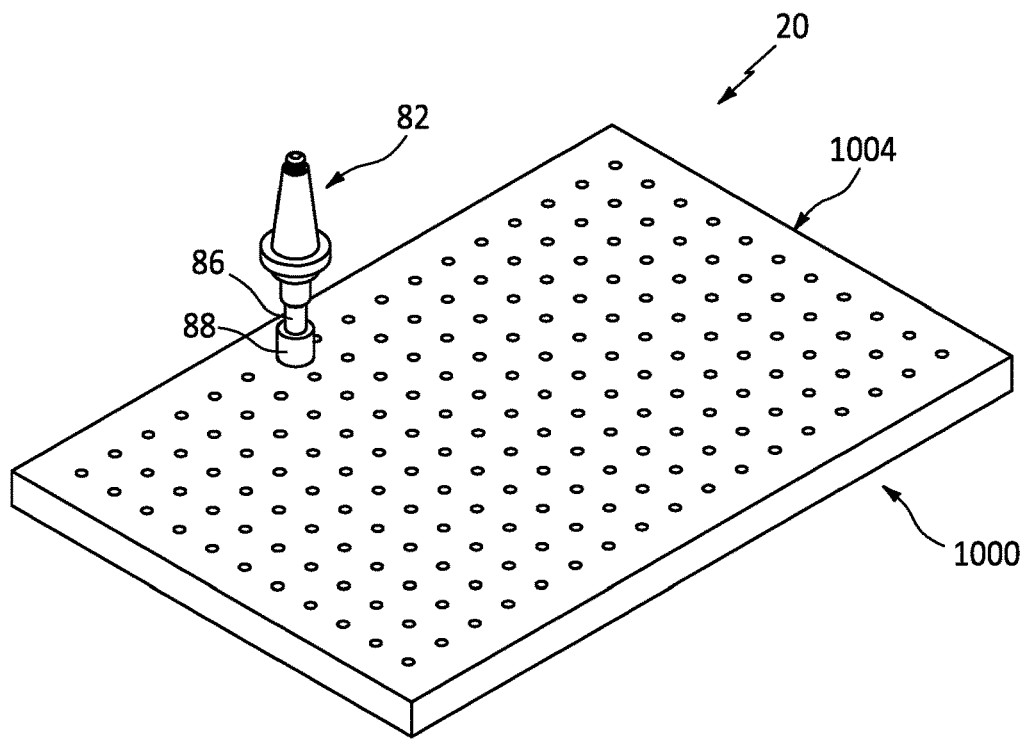
FIGS. 11-16 illustrate perspective views of a clamping system, in accordance with one or more embodiments of the present disclosure.

In Step 204, the clamp locator 82 is positioned, by the CNC system 1000, at a predetermined clamp location relative to the platform 1004 of the CNC system 1000 as shown, for example, in FIG. 11. The predetermined clamp location may correspond to an X, Y position relative to the platform 1004 (e.g., relative to a predetermined "zero" position of the platform 1004). The predetermined clamp location may be stored in the memory 1020 of the controller 1018 for the particular workpiece 1024 to be machined or otherwise manufactured (see FIG. 1). The predetermined clamp location may be determined using CAD or CAM software, for example, by applying the overlapping a representation of the outer cylindrical member 30, defined between an inner diameter and an outer diameter of the outer cylindrical member 30, with a portion of the represented workpiece for which clamping is desired. The CAD or CAM software may then determine coded programming instructions (e.g., G-code or M-code), including the predetermined clamp location which may substantially correspond to the clamp center axis 32. The coded programming instructions may be stored in the memory 1020 and executed by the controller 1018 to precisely position the base portion 24 on the platform 1004. The present disclosure, however, is not limited to any particular process for determining the predetermined clamp location or for developing coded programming instructions associated therewith.

With the clamp locator 82 mounted to the spindle 1012, the translating portion 86 of the clamp locator 82 and, hence the locating portion 88, may be in the raised position by default. The CNC system 1000 may position the locating portion 88 of the clamp locator 82 (e.g., the lower surface 108 of the cylindrical body 104) at a predetermined height (e.g., a Z position) relative to the platform 1004 which is greater than the height H1 of the outer cylindrical member 30 of the base portion 24 relative to the platform 1004 (see, e.g., FIGS. 4 and 9). The CNC system 1000 may maintain the locating portion 88 of the clamp locator 82 at the predetermined height as the clamp locator 82 is positioned relative to the platform 1004. Accordingly, CNC system 1000 may prevent a collision between the clamp locator 82 and any components of one or more clamps 22, such as the base portion 24, which may be positioned on the platform 1004. Moreover, the predetermined height may correspond to a height which is just above the height H1 of the outer cylindrical member 30 so that the clamp locator 82 and the base portion 24 can be easily engaged with one another, as will be discussed in further detail. For example, the CNC system 1000 may position the clamp locator 82 so that the lower surface 108 of the cylindrical body 104 is between 0.001 and 1.000 inch (0.00254 and 2.540 centimeters) above the height H1 of the outer cylindrical member 30, relative to the platform 1004 or, for example, approximately 0.100 inch (0.254 centimeters) above the height H1 of the outer cylindrical member 30. FIG. 9 illustrates an exemplary raised position of the locating portion 88 of the clamp locator 82 relative to the base portion 24. It should be understood, however, that the distance between the clamp locator 82 and the base portion 24 is exaggerated in FIG. 9 for clarity, and FIG. 9 should not be understood to be drawn to scale.

Figure 12:
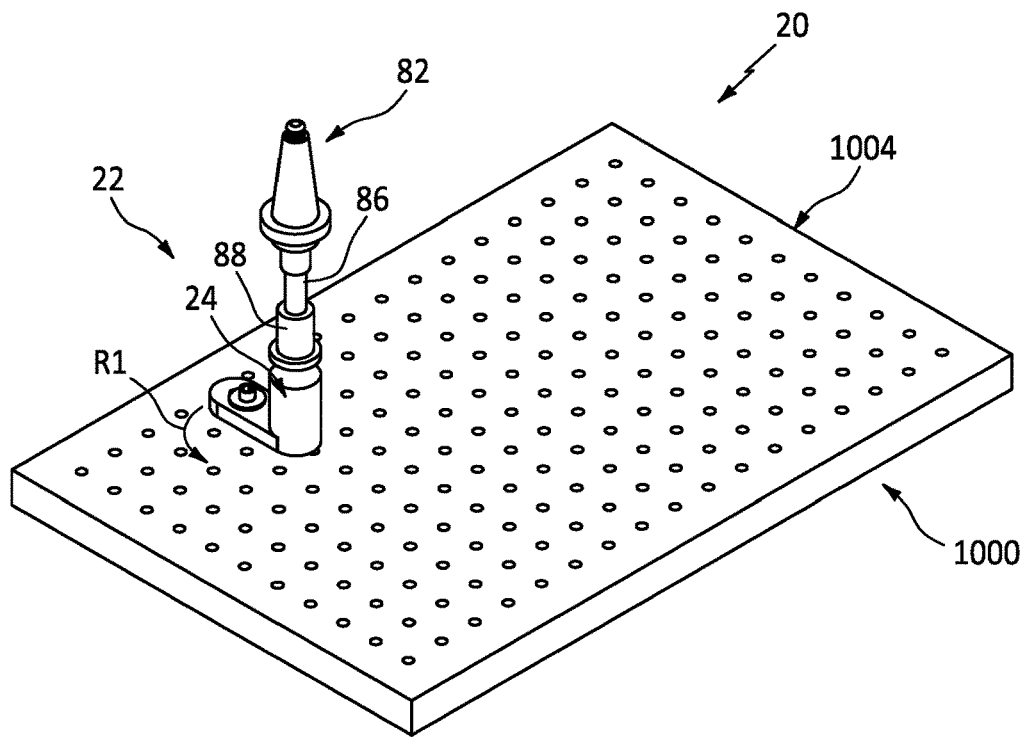

In Step 206, the base portion 24 of the clamp 22 is positioned on the platform 1004 at the predetermined clamp location using the clamp locator 82 as shown, for example, in FIG. 12. With the clamp locator 82 positioned in the predetermined clamp location by the CNC system 1000, the base portion 24 of the clamp 22 is positioned under the clamp locator 82 so that the opening 40 of the base portion 24 is substantially aligned with the cylindrical body 104 of the locating portion 88 (see FIG. 9). The locating portion 88 of the clamp locator 82 may then be pushed down (e.g., by an operator), from the raised position to the lowered position, so that the cylindrical body 104 of the locating portion 88 is positioned within the axial gap 54 at the opening 40 of the base portion 24. The X-Y position of the base portion 24 may be adjusted relative to the platform 1004, as necessary, to align the base portion 24 with the locating portion 88 and engage the locating portion 88 with the base portion 24. Accordingly, the base portion 24 of the clamp 22 can be quickly and precisely positioned relative to the platform 1004 using the CNC system 1000.

Figure 13:
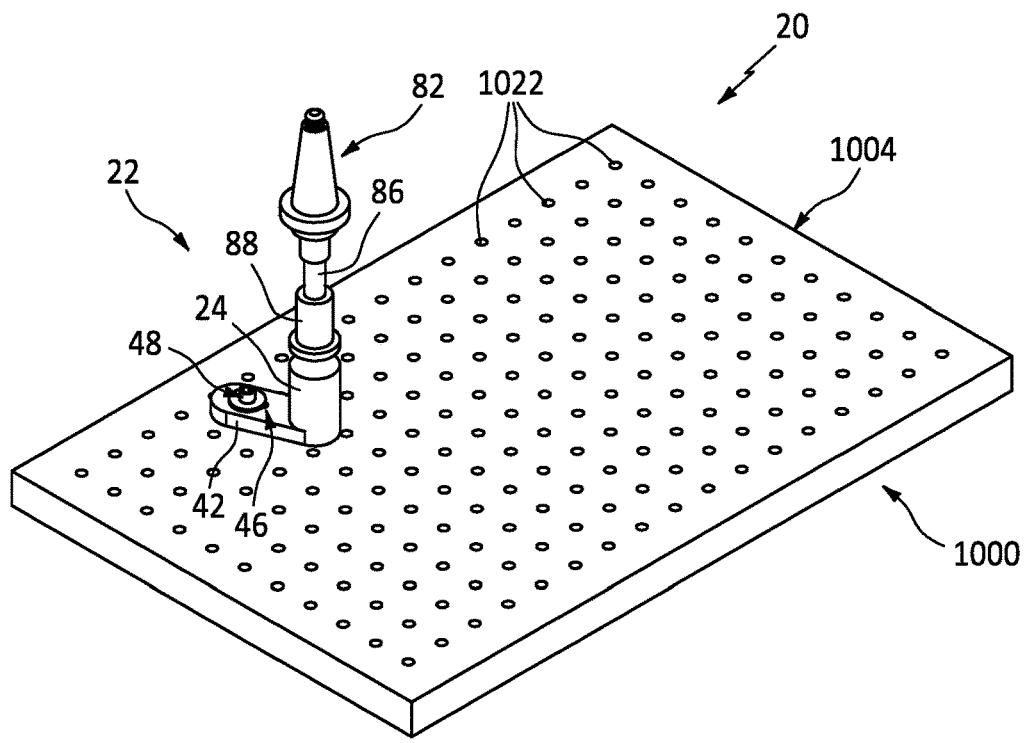

In Step 208, the base portion 24 of the clamp 22 is fixed to the platform 1004 as shown, for example, in FIG. 13. With reference to FIG. 4, the base portion 24 may be fixed to the platform 1004 by inserting the fastener 48 through the fastener aperture 46 of the fastening member 42 of the base portion 24 and securely engaging the fastener 48 with a respective aperture 1022 of the plurality of apertures 1022 of the platform 1004. Because of the cylindrical shape of the outer cylindrical member 30 and the cylindrical body 104 of the locating portion 88, the base portion 24 may be rotated about the clamp locator 82 (e.g., about the clamp center axis 32), in direction R1 for example (see FIGS. 12 and 13), until the fastener aperture 46 is substantially aligned with a respective aperture 1022 of the plurality of apertures 1022 of the platform 1004. Moreover, because the first clamping surface 36 of the outer base portion 24 is annular, the base portion 24 may be rotated to any position about the clamp locator 82 while still providing a suitable clamping surface for the workpiece 1024.

Figure 14:
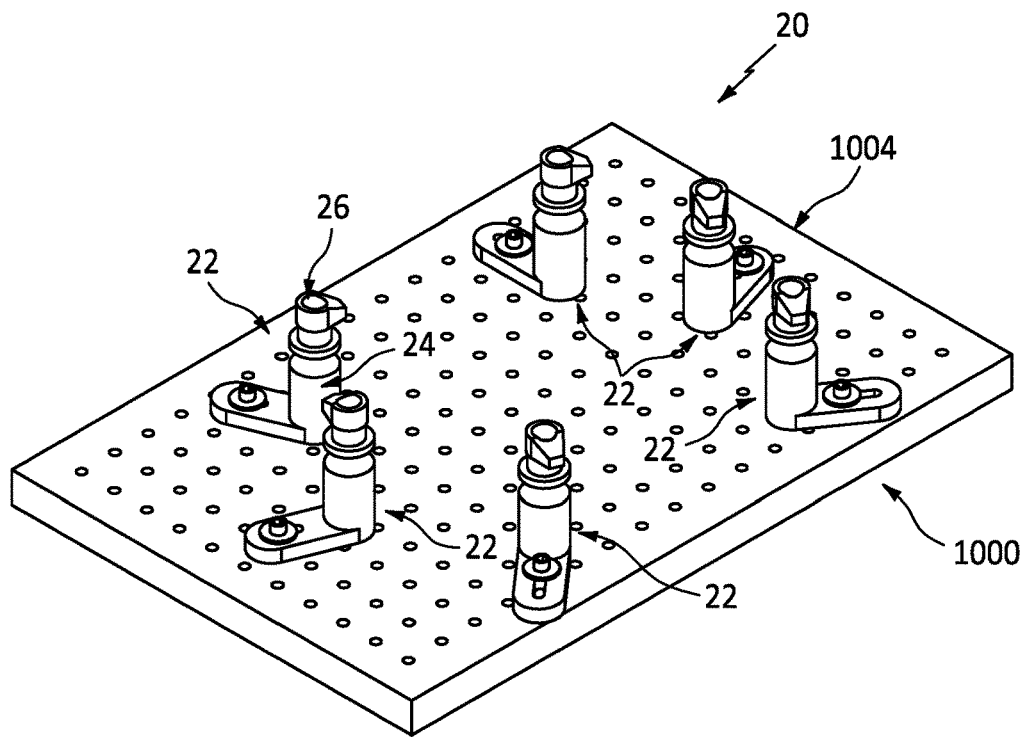

In Step 210, the grip portion 26 of the clamp 22 is installed in the base portion 24 of the clamp 22 as shown, for example, in FIG. 14. The cylindrical body 58 of the grip portion 26 may be inserted into the internal cavity 38 of the base portion 24 via the opening 40, as discussed above and shown in FIG. 4. In general, securely positioning the workpiece 1024 for a manufacturing operation may include the use of multiple clamps 22. Accordingly, Steps 202, 204, 206, 208, and 210 may be performed for each clamp 22 of the clamping system 20 which is intended to be used for the particular workpiece to be machined or otherwise manufactured. FIG. 14 illustrates six clamps 22 fixed to the platform 1004, however, it should be understood that the present disclosure is not limited to any particular number of clamps 22 for use with a particular workpiece.

Figure 15:
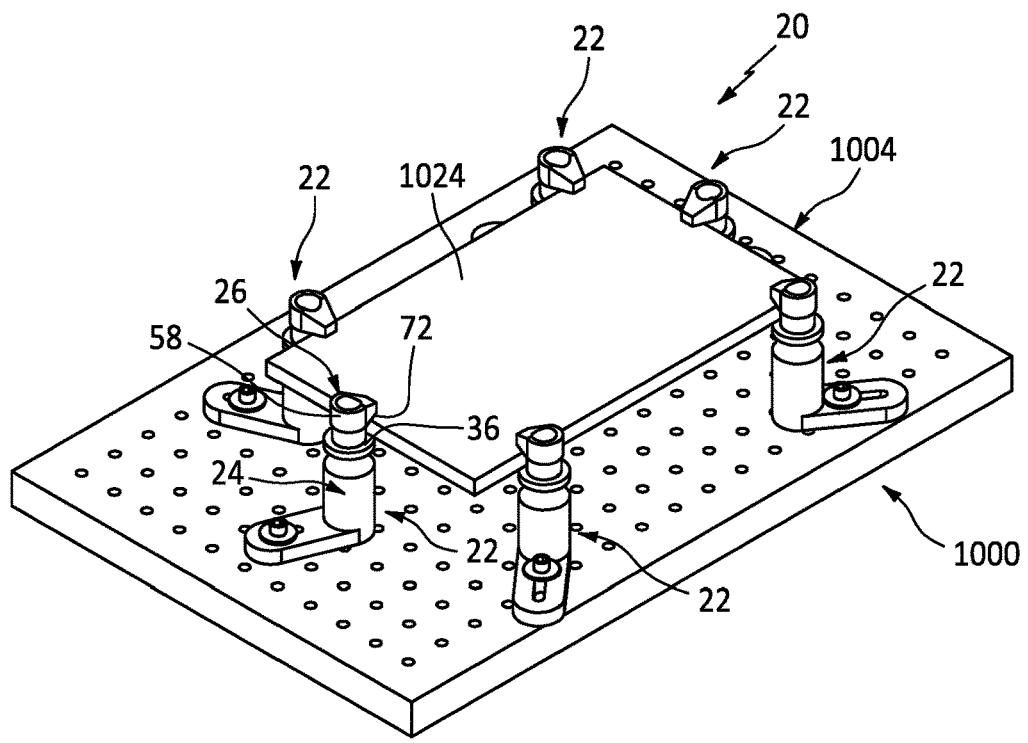

In Step 212, the workpiece 1024 is positioned on one or more clamps 22 between the base portion 24 and the grip portion 26 of the clamp 22 as shown, for example, in FIG. 15. More particularly, and as shown in FIG. 4, the workpiece 1024 is positioned between the annular first clamping surface 36 of the base portion 24 and the second clamping surface 72 of the grip portion 26. In some embodiments, the workpiece 1024 may be moved relative to one or more clamps 22 (e.g., along an X-Y plane) so that one or more edges of the workpiece 1024 abut the cylindrical body 58 of the grip portion 26 of one or more clamps 22. The grip portion 26 may, thereby, act as a backstop for the workpiece 1024 allowing an operator to more easily and precisely position the workpiece 1024 relative to the platform 1004. The cylindrical body 58 of the grip portion 26 is translatable within the base portion 24 along the clamp center axis 32. Accordingly, the grip portion 26 may be positioned relative to the base portion 24 to accommodate a wide range of workpiece 1024 dimensions, shapes, etc. In at least some other conventional clamp systems, heel blocks are used between clamping surfaces and the retained workpieces to accommodate different workpiece thicknesses. The "self-heeling" configuration of the present disclosure clamp 22 eliminates the need for heel blocks to accommodate different workpieces such as the workpiece 1024. Further, the height H1 of the outer cylindrical member 30 (see FIG. 4), from the platform 1004 to the annular first clamping surface 36, provides a suitable height between the workpiece 1024 and the platform 1004 to allow for convenient operator access as well as chip (e.g., machining debris) evacuation from between the workpiece 1024 and the platform 1004.

Figure 16:
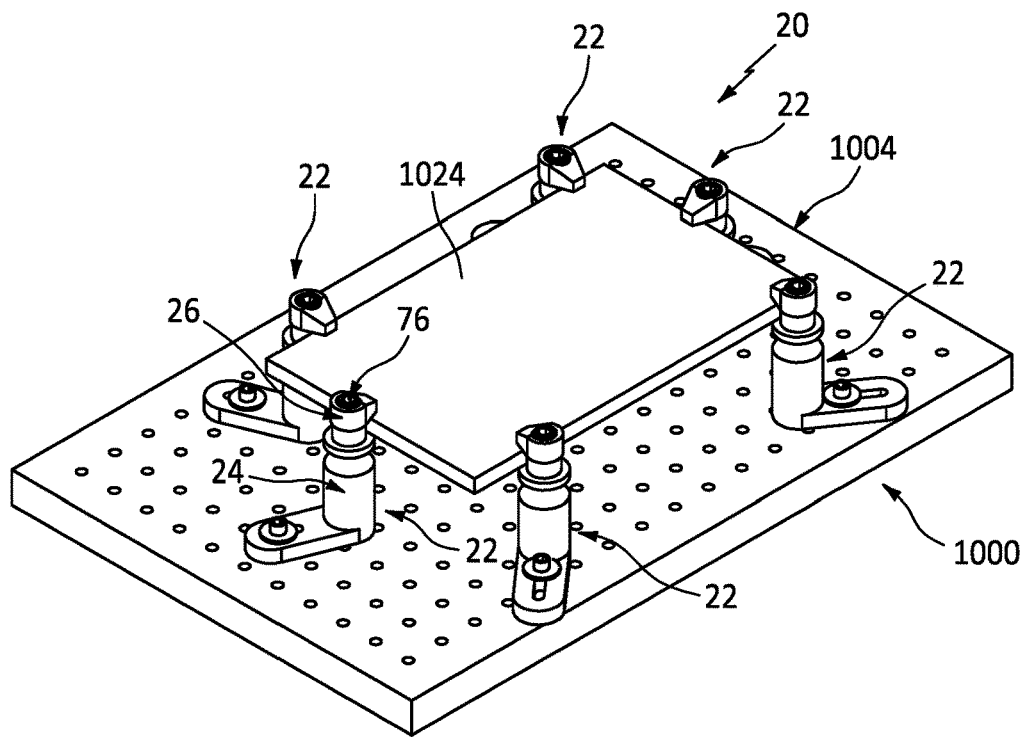

In Step 214, the grip portion 26 of the clamp 22 is secured to the base portion 24 clamp 22 as shown, for example, in FIG. 16. In other words, the grip portion 26 is positionally fixed relative to the base portion 24 so that the workpiece 1024 is securely retained between the grip portion 26 and the base portion 24. In some embodiments, the grip portion 26 may be fixed to the base portion 24 by inserting the fastener 76 through the fastener aperture 74 of the grip portion 26 and securely engaging the fastener 76 with the fastener aperture 56 of the inner cylindrical member 50 of the base portion 24 (see FIG. 4). Step 214 may be performed for each clamp 22 of the clamping system 20 which is intended to be used for the particular workpiece to be machined or otherwise manufactured.

As used herein, the term "substantially" with respect an angle or angular orientation may refer to the indicated angle or angular orientation within a range of +/−five percent. In the case of dimensional tolerances, the term "substantially" may be understood to indicate that the particular dimension may vary slightly from the reference dimension as a result of component machining tolerances, temperature affects, and other nominal conditions.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A clamp comprising:
    a base portion having a base end, the base portion including a base body forming an outer cylindrical member and an inner cylindrical member, the outer cylindrical member and the inner cylindrical member extending circumferentially about a clamp center axis, the outer cylindrical member extending from the base end to an outer distal end, the outer distal end of the outer cylindrical member defining an annular first clamping surface disposed about the clamp center axis, the outer cylindrical member defining an outer base internal cavity extending from a base opening, the outer base internal cavity extending circumferentially about the clamp center axis radially between the outer cylindrical member and the inner cylindrical member, the outer base opening located at the outer distal end of the outer cylindrical member and
    the inner cylindrical member disposed radially inward of the outer cylindrical member, the inner cylindrical member extending radially between an outer cylindrical side and an inner cylindrical side, the outer cylindrical side forming the outer base internal cavity, the inner cylindrical side forming a threaded internal aperture of the inner cylindrical member extending on and along the clamp center axis; and
    a grip portion including a cylindrical body and a grip member extending radially outward from the cylindrical body with respect to the clamp center axis, the grip portion including a second clamping surface, the cylindrical body configured to be positioned within the outer base internal cavity of the base portion such that the second clamping surface of the grip portion radially overlaps the annular first clamping surface of the base portion.

2. The clamp of claim 1, wherein the cylindrical body of the grip portion is configured to surround the inner cylindrical member with the cylindrical body positioned within the outer base internal cavity of the base portion.

3. The clamp of claim 2, wherein the inner cylindrical member extends from the base end to an inner distal end and the inner distal end is located axially inward of the outer distal end with respect to the clamp center axis to define an axial gap between the outer distal end and the inner distal end.

4. The clamp of claim 2, wherein the cylindrical body includes a fastener aperture extending from the outer end to the threaded internal aperture with the positioned within the outer base internal cavity, the fastener aperture disposed about the clamp center axis.

5. The clamp of claim 1, wherein the base body forms a fastening member extending radially outward from the outer cylindrical member, the fastening member extends from the base end to a distal fastening end opposite the base end, the fastening member including an elongated fastening aperture extending from the distal fastening end to the base end.

6. The clamp of claim 1, wherein the grip portion is configured to rotate about the clamp center axis with the cylindrical body positioned within the base internal cavity.

7. The clamp of claim 1, wherein the grip member of the grip portion includes a dowel defining at least a portion of the second clamping surface.

* * * * *